United States Patent [19]

Williams

[11] Patent Number: 4,750,574

[45] Date of Patent: Jun. 14, 1988

[54] ACCURATE WEIGHT DETERMINATION AT SEA

[75] Inventor: Gerald J. Williams, Key Biscayne, Fla.

[73] Assignee: General Oceanics, Inc., Miami, Fla.

[21] Appl. No.: 9,888

[22] Filed: Feb. 2, 1987

[51] Int. Cl.[4] .................. G01G 19/00; G01G 19/52; G01G 23/00

[52] U.S. Cl. ........................... 177/25; 177/50; 177/255

[58] Field of Search ............... 177/255, 147, 50, 1, 177/25.14

[56] References Cited

U.S. PATENT DOCUMENTS

| | | |
|---|---|---|
| 3,674,097 | 7/1972 | Gile . |
| 3,685,604 | 8/1972 | Smith et al. . |
| 3,826,319 | 7/1974 | Loshbough . |
| 3,921,736 | 11/1975 | Rogers . |
| 3,985,025 | 10/1976 | Ormond ........................ 177/255 X |
| 4,008,405 | 2/1977 | Neumann et al. . |
| 4,055,753 | 10/1977 | Rogers et al. . |
| 4,100,985 | 7/1978 | Meler . |
| 4,134,464 | 1/1979 | Johnson et al. . |
| 4,219,091 | 8/1980 | Kleinhans ....................... 177/255 X |
| 4,317,496 | 3/1982 | Krause . |
| 4,339,010 | 7/1982 | Malikov et al. ................. 177/255 X |
| 4,344,495 | 8/1982 | Kovacs ........................... 177/255 X |
| 4,368,792 | 1/1983 | Ottle ............................... 177/255 X |
| 4,375,839 | 3/1983 | Manning et al. . |
| 4,552,235 | 11/1985 | Brunnschweiler ............... 177/50 X |
| 4,660,160 | 4/1987 | Tajima et al. . |
| 4,677,579 | 6/1987 | Radomilovich ................. 177/147 X |

FOREIGN PATENT DOCUMENTS 55-22136 2/1980 Japan .............................. 177/255

OTHER PUBLICATIONS

Product Brochure: New Industrial Scales, 1026 and 1027 Series, Parmer Instrument Company, Chicago, Ill.
Product Brochure: Accelerometer/Tilt Sensor, General Oceanics, Miami FL.

Primary Examiner—George H. Miller, Jr.
Attorney, Agent, or Firm—Jerry A. Miller

[57] ABSTRACT

A weight measurement apparatus, includes a weight scale having a weight output for providing a weight output signal indicative of the apparent weight of an object being weighed. An accelerometer (or an array of accelerometers) is used to measure a force which contributes to the apparent weight and causes the apparent weight to deviate from the object's true weight. A computer coupled to the scale and the accelerometer computes the true weight of the object from the apparent weight and the accelerometer output. This true weight is displayed on a digital display.

25 Claims, 3 Drawing Sheets

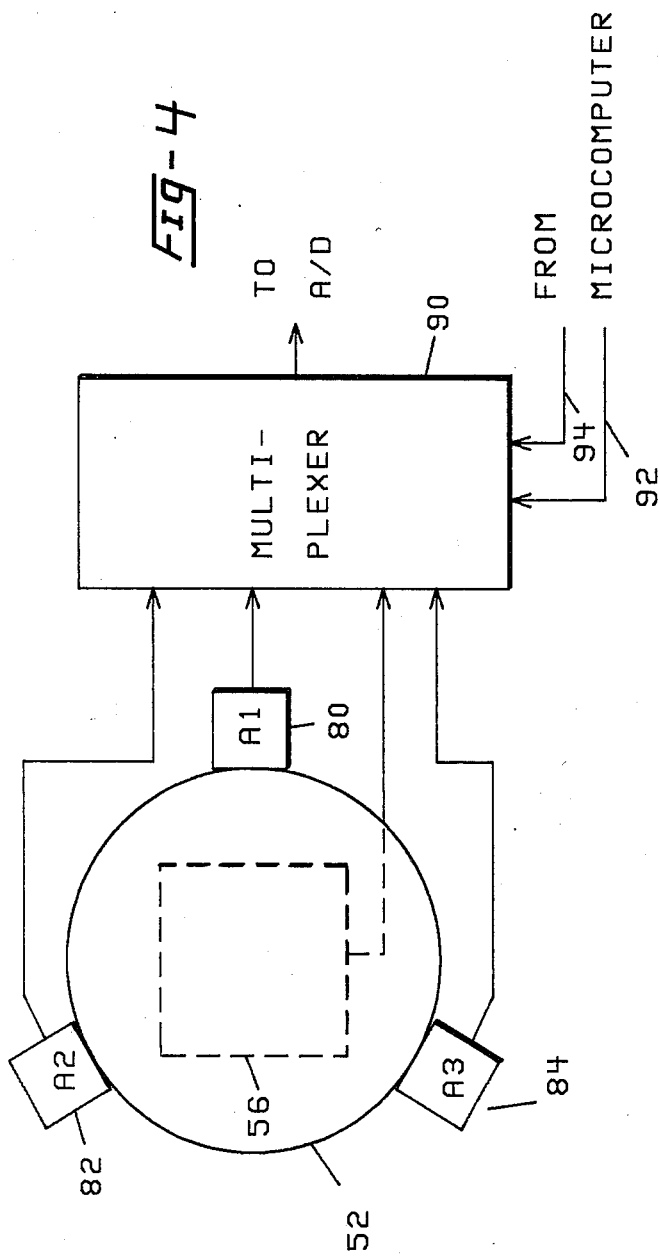
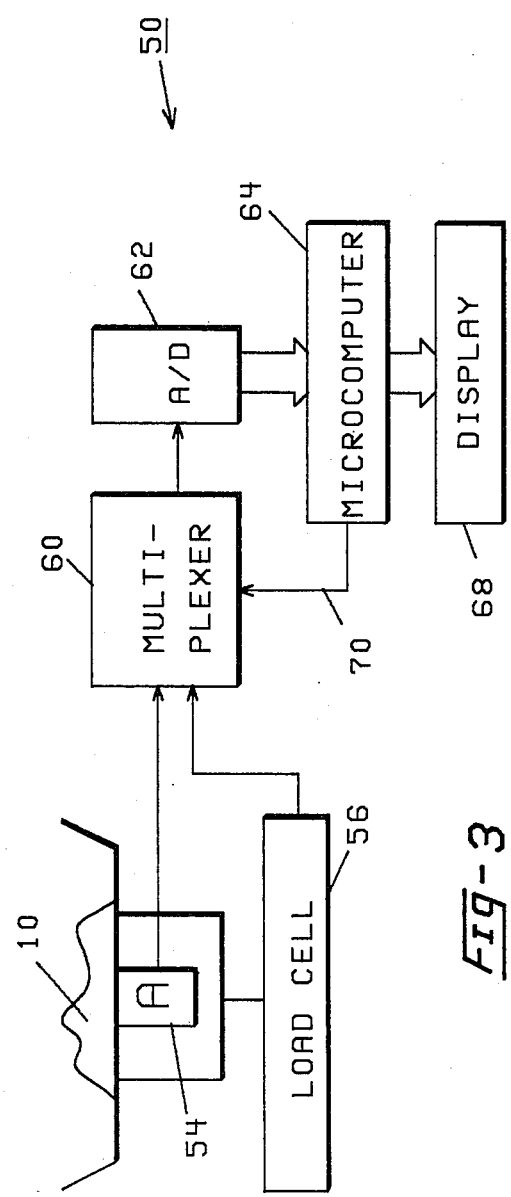

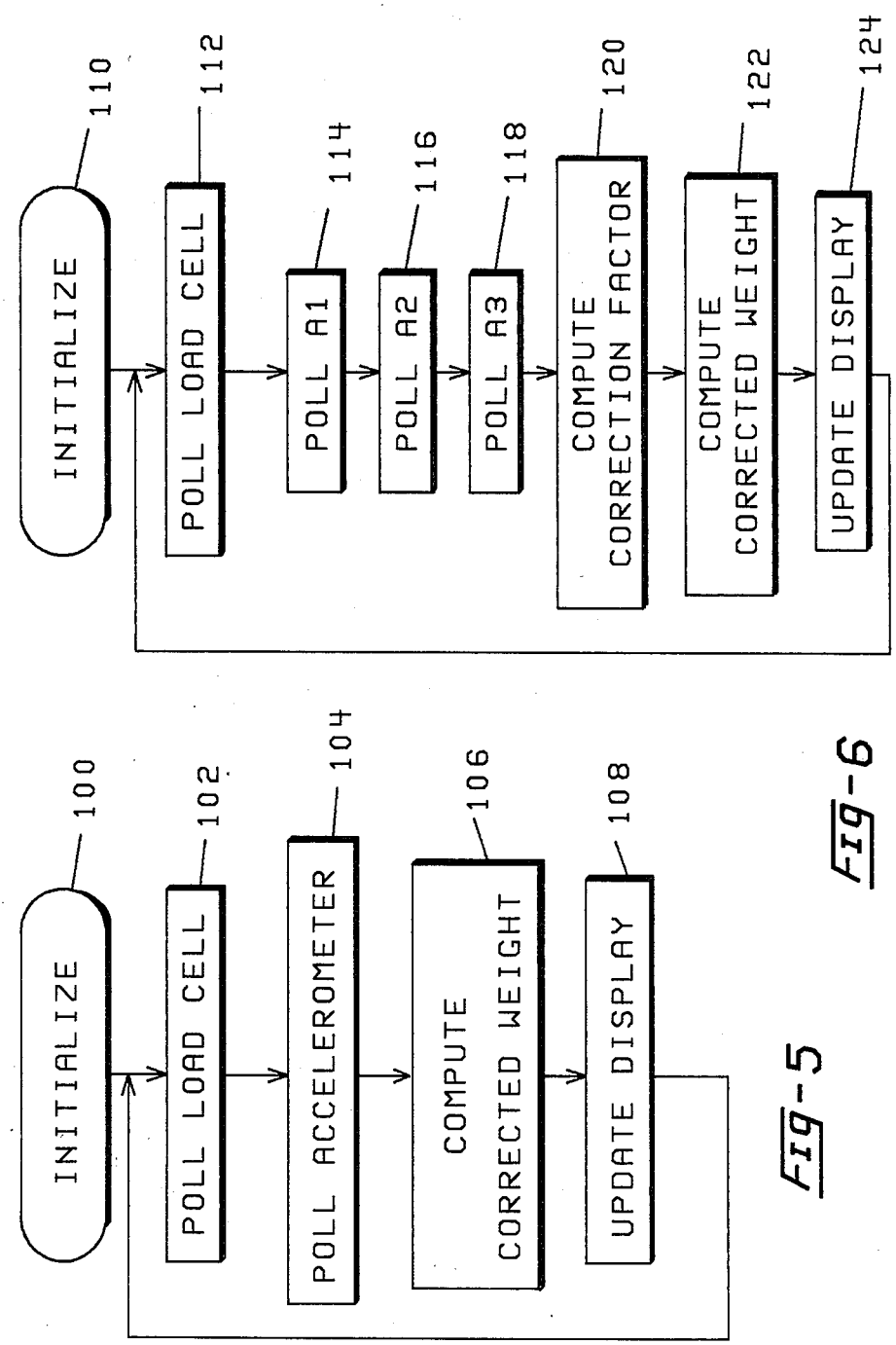

ACCURATE WEIGHT DETERMINATION AT SEA

BACKGROUND OF THE INVENTION

1. FIELD OF THE INVENTION

This invention relates generally to the field of weighing scales. More particularly, this invention relates to a method and apparatus for weighing objects on moving platforms such a the deck of a ship wherein movement of the platform can upset the accuracy of the weight measurement.

2. BACKGROUND

In attempting to weigh objects on moving surfaces such as the deck of a ship at sea, the constant rotational accelerations due to the rolling and pitching of the ship can introduce significant errors in the accuracy of conventional weight measuring devices. Such roll and pitch movements can result in accelerations of $\pm\frac{1}{4}$ g or even more depending on the vessel type and state of the sea. A $\frac{1}{4}$ g acceleration typically produces a weight variation of 25% so that a window of $\pm 25\%$ on the accuracy of a conventional weight measurement is possible.

This is clearly an unacceptable variation in the accuracy of weight determination by almost any standard. It can be particularly troublesome to fisherman who need a determination of the weight of a catch at sea or to scientists who must make weight measurements at sea.

FIG. 1 and FIG. 2 illustrate in schematic form the conventional weight measurement devices of the prior art. In FIG. 1, the conventional spring scale is shown. In this device, the actual weight of the object 10 is measured. Object 10 is placed in a scale pan 12 which is attached to one end of a spring 14. The scale pan 12 is also attached to a pointer 16 which points to a graduated scale 18. The other end of the spring is held rigid and the deformation of the spring is correlated to a weight of the object which may be read out on the graduated scale 18. Unfortunately, this scale depends upon no outside accelerations being applied to the rigid end 20. Such accelerations are difficult or impossible to avoid on a ship at sea.

FIG. 2 shows the other conventional mechanism for weight measurement—the balance. In this mechanism, the object 10 of unknown weight is compared with an object of known weight 24. The balance, therefore, actually measures mass which is related to weight by the acceleration of gravity:

$$F = m*A \tag{1}$$

where:
F=weight
m=mass
A=the acceleration of gravity.

The variations in the effect of gravity will be ignored for the purposes of this discussion and the terms weight and mass may be used interchangeably.

The conventional balance uses a pair of scale pans 26 and 28 which are used to carry the unknown weight 10 and the known weight 24 respectively. These pans are suspended from the ends of a beam 30 which is rigidly balanced in the middle as shown at 32. Of course, it need not be suspended in the middle if this is taken into consideration in the weight comparison.

If it is assumed that the acceleration of gravity is constant, the balance can then be used to measure weight. Unfortunately, the balance is also prone to disruption in accuracy by the roll and pitch of a ship at sea. Consider a model of this movement as an angular acceleration R about point 34 as shown. The centrifugal forces F1 and F2 as shown are given by:

$$F1 = r1*R*m \tag{2}$$

$$F2 = r2*R*m \tag{3}$$

The components contributing to the unbalance are:

$$f1 = F1*\cos(\theta 1) \tag{4}$$

$$f2 = F2*\cos(\theta 2) \tag{5}$$

where
$\theta 1$ is the angle between F1 and f1,
$\theta 2$ is the angle between F2 and f2.

Thus, except for the rare instances where $\theta 1$ and $\theta 2$ are equal, the balance also does not provide an accurate measurement when subjected to outside accelerations.

Most conventional weight measurement devices use one of these two principles to measure weight. Some use electronic pressure transducers and the like as a substitute for a spring and operate under computer control.

The problem of measuring weight at sea or in the presence of outside accelerations is largely alleviated by the present invention which provides a novel arrangement for a weight measurement apparatus.

SUMMARY OF THE INVENTION

Accordingly, it is an object of the present invention to provide an improved weight measurement apparatus and method.

It is another object of the present invention to provide a weight measurement apparatus which is largely unaffected by outside accelerations such as the pitch and roll of a ship at sea.

It is another object of the present invention to provide a computer controlled weighing scale which uses one or more accelerometers to correct for outside accelerations such as the pitch and roll of a ship at sea.

It is a further object and advantage of the present invention to provide a method and apparatus for measuring weight which is not dependent upon having a stationary platform for mounting which is free of outside accelerations.

In one embodiment of the present invention an improved weight measurement apparatus, includes in combination a scale having a weight output for providing a weight output signal indicative of the apparent weight of an object being weighed. A sensor measures an acceleration which contributes to the apparent weight and causes the apparent weight to deviate from the object's true weight. The sensor has an acceleration output for providing an acceleration output signal indicative of the contribution of the acceleration to the apparent weight. A computer coupled to the scale and sensor and receiving the weight output signal and the acceleration output signal, computes the true weight of the object from the acceleration output signal and the weight output signal. In a preferred embodiment, the apparatus further includes a display coupled to the computer for displaying the actual weight of the object. Preferably the computer is a programmed microcomputer.

In another embodiment of the present invention a method of measuring the weight of an object, includes the steps of polling a load cell to determine an apparent weight; polling a sensor to determine an acceleration contributing to the apparent weight and causing the apparent weight to deviate from the object's true weight; and computing a corrected weight from the apparent weight and the acceleration. In the preferred method, the corrected weight is displayed on a display.

These and other objects, features, and advantages of the invention will become apparent to those skilled in the art upon consideration of the following detailed description taken in conjunction with the accompanying drawings.

BRIEF DESCRIPTION OF THE DRAWINGS

FIG. 3 is a schematic view of one embodiment of the present invention.

FIG. 4 is a schematic view of a second embodiment of the present invention.

FIG. 5 is a flow chart of one method of operation of the invention as shown in FIG. 3.

FIG. 6 is a flow chart of a method of operation of the embodiment of the invention shown in FIG. 4.

DETAILED DESCRIPTION OF THE INVENTION

Figure 2:
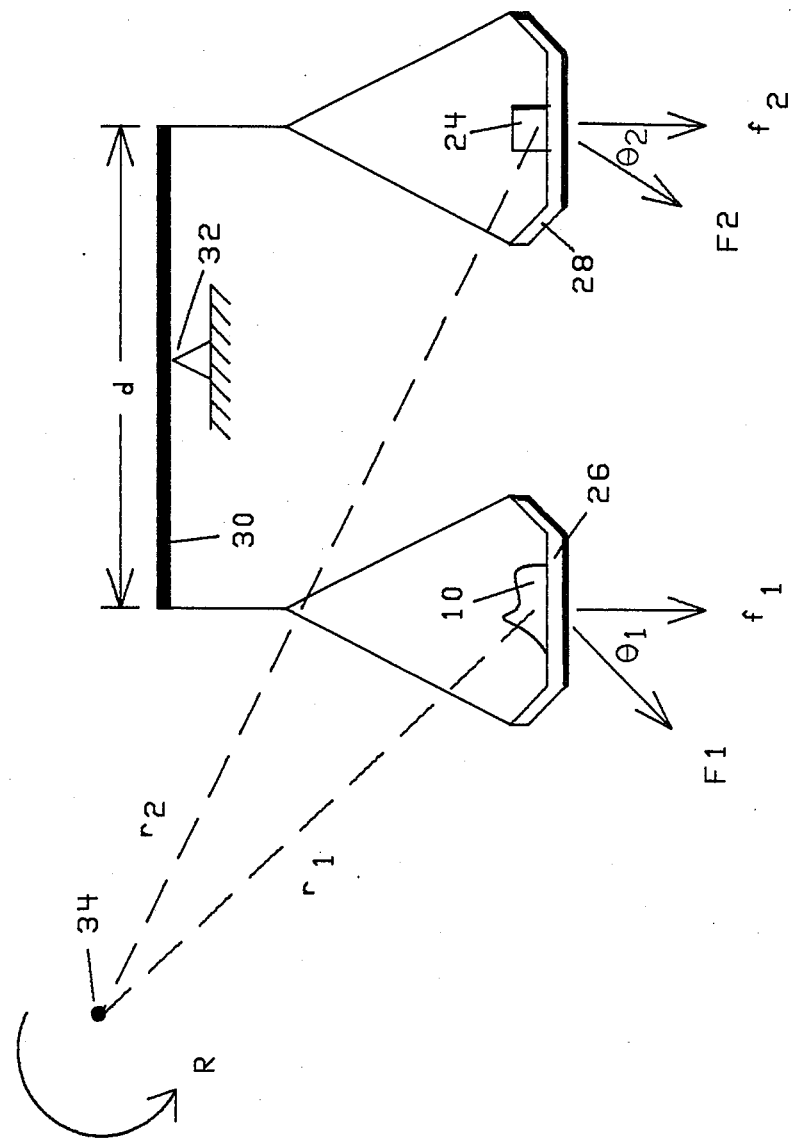
FIG. 2 is a view of a prior art balance weight scale.
Figure 1:
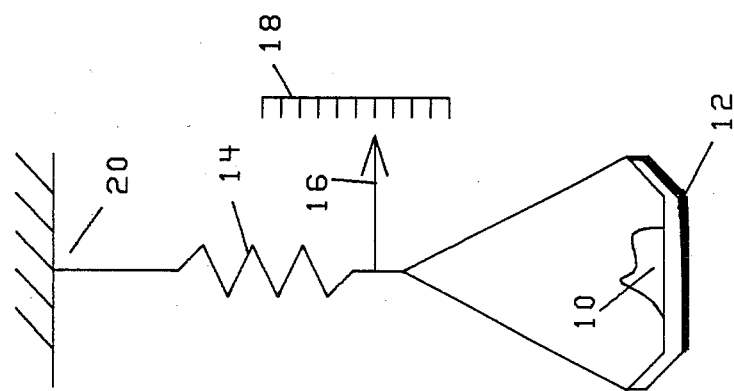
FIG. 1 is a view of a prior art spring weight scale.

Turning now to the drawings wherein like reference numerals designate identical or corresponding parts throughout the several views, and more particularly referring once again to FIG. 2 thereof, note that it follows from Equations 4 and 5 that:

$$f2 - f1 = m*R*\{r2*\cos(\theta 2) - r1*\cos(\theta 1)\} \quad (6)$$

and $$r2*\cos(\theta 2) - r1*\cos(\theta 1) = d \quad (7)$$

thus:

$$f2 - f1 = m*R*d \quad (8)$$

Therefore, the unbalancing force applied to the scale is proportional to the distance d. So if this distance can be made to equal zero, the unbalancing force will equal zero.

This is, of course, an impossible task since the object 10 and the known weight 24 cannot occupy the same space. However, this can be approximated closely by the present invention designated generally as 50 in FIG. 3. The object to be weighed 10 is placed in a scale pan 52 with a sensor 54 placed directly under the object. In practice, it may be difficult to place the sensor directly under the object but it should be as close as is practical.

In the preferred embodiment, the sensor 54 is an accelerometer. The General Oceanics model 6020 Accelerometer/Tilt Sensor is suitable for this purpose and is available commercially from General Oceanics, 1295 N.W. 163rd Street, Miami, Fla. 33169. Other commercially available sensors may also be suitable. This preferred device operates on the so-called force-balance principle in which a small meter movement coil uses a small bob weight attached to its pointer so that acceleration or tilt causes the pointer to deviate slightly from its rest position. This deviation is detected by an optical sensor to create an output signal which is amplified to provide an output signal indicative of acceleration or tilt. This type of accelerometer is preferred due to its very high accuracy, but other types of accelerometers may be suitable for some embodiments.

The sensor is used to detect any outside forces which may contribute to the object having an apparent weight which deviates from its actual weight. Such forces include, but are not limited to the pitch and roll of a boat or plane.

The scale pan 52 is attached to a load cell or pressure transducer 56 as is conventional in commercially available weight scales such as the 1027 series weighing scales supplied by ColeParmer Instrument Company of 7425 North Oak Park Ave., Chicago, Ill. 60648. The load cell output as well as the accelerometer output are coupled to a multiplexer circuit 60 which selectively applies one of these analog signals to an analog to digital (A/D) converter 62 which may provide it's digital output signal in either serial or parallel form. The multiplexer 60 may be based around commercially available analog switches or the like such as the Analog Devices, Inc. AD7501. The digitized output of the A/D converter is applied to a computing circuit 68 which is preferably a microcomputer.

The microcomputer 68 alternately polls the sensor 54 and the load cell 56 by instructing the multiplexer 60, via control line 70, to poll one or the other. Microcomputer 64 may then correct the apparent weight as read by the load cell 56 using the correction factor obtained from the sensor 54. In this embodiment, the correction may be made by converting the reading of the sensor 54 from a voltage (or current) to a signed fraction of the acceleration of gravity designated K. The actual weight may then be computed as follows:

$$\text{Actual weight} = \text{Apparent weight}*(1 - K) \quad (9).$$

This approximation of the actual weight (which will hereinafter be referred to simply as the actual weight or corrected weight) is then displayed on display 68. Display 68 may be any suitable display device such as an Light Emitting Diode (LED) display, a Liquid Crystal Display (LCD), a printer or Cathode Ray Tube (CRT) based display. The weight may also be sent to various storages devices such as computer disks or tapes as desired.

The typical (rule of thumb) period of the motion of a ship about the roll axis at sea is greater than six seconds. Therefore, if the above measurements are made and the resultant calculation and display updated approximately every 0.1 seconds, adequate accuracy is likely to be obtained for most purposes. Of course, those skilled in the art will recognize that the accuracy may be enhanced by taking an average of a number of samples or by other suitable filtering techniques known in the art.

Turning now to FIG. 4, another embodiment of the present invention is shown which may enhance the accuracy of the weight measurement under some conditions. In this embodiment, the scale pan 52 is shown from above. The load cell 56 is shown in broken lines. In this embodiment, a plurality of sensors 80, 82 and 84 designated A1, A2 and A3 respectively are disposed around the load pan to surround the object to be weighed. This in effect allows for measurement of the accelerations at the center of the scale pan by mathematically extrapolating that acceleration from the accelerations measured by the three sensors. The sensors are preferably three in number and spaced at 120° incrementa equidistant from the center of the scale pan.

By taking the mean of the readings from the three accelerometers, a good approximation of the forces present at the center of the scale pan may be obtained as follows:

$$\text{Composite} = (A1 + A2 + A3)/3.0 \quad (10)$$

where

A1, A2, A3 = the output of Accelerometers 80 82 and 84 respectively.

As with the apparatus of FIG. 3, various averaging or filtering operations may also enhance accuracy.

The four signals from 56, 80, 82 and 84 are provided to a four channel multiplexer 90 for processing in a manner similar to that of multiplexer 60. In the current embodiment, of course, all four signals are preferably polled in the same time requirements of the two signals of device 50. Also, since there are four inputs to select, at least 2 binary control lines 92 and 94 are needed from the microcomputer.

Those skilled in the art will appreciate that many alternatives are possible without departing from the present invention. For example, the accelerations may be measured by other configurations of sensors. For example, two sensors at 180° spacing or four sensors at 90° spacings may be suitable for some embodiments. Similarly, it may be possible to provide one sensor above and one below the object to be weighed. Of course, numerous combinations and variations of the above are possible and contemplated by this invention.

Turning now to FIG. 5, the method of operation and programming of the microcomputer in connection with weighing device 50 is shown. The process starts at step 100 in which the system is initialized at power-up. This is an appropriate time for a zero check of the scale with no load if desired. Control then passes to 102 wherein the load cell is polled to read the apparent weight of the object. Next, at step 104, the sensor is polled to read the acceleration forces corrupting the weight measurement. Next, the corrected weight is computed at 106. Finally, at 108, the display is updated with the correct weight and control passes back to step 102.

Turning now to FIG. 6, the process of the modified system using three accelerometers as in FIG. 4 is described. This process starts with a similar initialization process at 110 and a polling of the load cell at 112. Next, the three sensors A1, A2 and A3 are sequentially polled in steps 114, 116 and 118 and a correction factor is computed by averaging the three sensor readings and converting this average to a signed fraction of the acceleration of gravity. The corrected weight is then computed at 122 and displayed at 124. Control then passes to 112.

Those skilled in the art will recognize that it is also possible to preprocess the three sensor readings to produce a composite and then use a two port multiplexer as in 50 to poll the sensor composite and the load cell. Also, those skilled in the art will note that the computer may be embodied in various forms, for example, a conventional microprocessor based computer, an analog computer or a dedicated hardware computing machine designed specifically for this purpose. Numerous other variations will occur to those skilled in the art.

THUS, it is apparent that in accordance with the present invention, a method and apparatus that fully satisfies the aims, advantages and objectives is set forth above. While the invention has been described in conjunction with specific embodiments, it is evident that many alterations, variations and modifications will become apparent to those skilled in the art in light of the foregoing description. Accordingly, it is intended that the present invention embrace all such alternatives, modifications and variations as fall within the spirit and broad scope of the appended claims.

What is claimed as new and desired to be secured by Letters Patent of the United States is:

1. A weight measurement apparatus with provision for compensating for errors which are the result of movement of the weight measurement apparatus itself caused by movement of a platform upon which the apparatus is located such as the pitch and roll of waves and similar movements when the weight measurement apparatus is used aboard a ship at sea, the weight measurement apparatus comprising in combination:
   scale means, having a weight output, for providing a weight output signal indicative of an apparent weight of an object being weighed;
   acceleration sensing means for measuring an outside acceleration on said object being weighed which contributes to said apparent weight and causes said apparent weight to deviate from said object's true weight, said sensing means having an acceleration output for providing an acceleration output signal indicative of the contribution of said acceleration to said apparent weight; and
   computing means, coupled to said scale means and said sensing means and receiving said weight output signal and said acceleration output signal, for computing the true weight of said object from said acceleration output signal and said weight output signal.

2. The apparatus of claim 1, further including a display means coupled to said computing means for displaying the actual weight of said object.

3. The apparatus of claim 2, wherein said display further includes a digital display.

4. The apparatus of claim 1, wherein said computing means includes a programmed microcomputer.

5. The apparatus of claim 4, wherein said signals are analog signals and further including an analog to digital converter means for converting said analog signals to digital signals for processing by said microcomputer.

6. The apparatus of claim 4, further including multiplexing means for receiving said acceleration output signals and said weight output signals and directing one of said signals to said microcomputer, said multiplexing means being responsive to said microcomputer so that said microcomputer may select which of said signals is to be directed to it.

7. The apparatus of claim 6, wherein said microcomputer instructs said multiplexing means to send each one of said signals at least once every 0.1 seconds.

8. The apparatus of claim 1, wherein said microcomputer further includes means for converting said acceleration output signal to a signed fraction of the acceleration of gravity designated K, and wherein said microcomputer computes said actual weight by computing:

$$\text{Actual weight} = \text{Apparent weight} * (1 - K).$$

9. The apparatus of claim 1, further including a scale pan for holding said object and wherein said sensing means is situated adjacent and under said scale pan.

10. The apparatus of claim 1, wherein said sensing means includes means for sensing a plurality of accelerations from a plurality of locations surrounding said object.

11. The apparatus of claim 10, further including means for computing a correction factor from said plurality of accelerations for use in converting said apparent weight to said actual weight.

12. The apparatus of claim 1, wherein said sensing means includes an accelerometer.

13. The apparatus of claim 12, wherein said accelerometer is of the type which operates on the so called force-balance principle.

14. A weight measurement apparatus, comprising in combination:
   scale means having a weight output for providing a weight output signal indicative of the apparent weight of an object being weighed;
   holder means, for holding said object to be weighed;
   acceleration sensing means including a plurality of acceleration sensors disposed adjacent to said holder means in locations surrounding said holder means for measuring a plurality of accelerations which contribute to said apparent weight and causes said apparent weight to deviate from said object's true weight, said sensing means having a plurality of acceleration outputs for providing a corresponding plurality of acceleration output signals indicative of the contribution of each of said accelerations to said apparent weight; and
   computing means, coupled to said scale means and said sensing means and receiving said weight output signal and said acceleration output signals, for computing the true weight of said object from said acceleration output signals and said weight output signal.

15. The apparatus of claim 14, further including a display means coupled to said computing means for displaying the actual weight of said object.

16. The apparatus of claim 14, wherein said computing means includes a programmed microcomputer.

17. The apparatus of claim 14, wherein said plurality of sensors include a plurality of accelerometers.

18. The apparatus of claim 14, wherein said sensing means includes three sensors disposed symmetrically about said holder means at 120° increments.

19. The apparatus of claim 14, wherein said computing means includes means for averaging the force output signals to produce a composite force output signal for use in computing said true weight.

20. The apparatus of claim 14, wherein said computing means includes means for averaging said acceleration output signals.

21. The apparatus of claim 14, wherein each of said signals is received by said computing means at least once every 0.1 seconds.

22. A method of measuring the weight of an object using a weighing apparatus which supports said object and which is subjected to outside accelerations due to movements such as the roll and pitch of a ship at sea, comprising the steps of:
   polling a load cell to determine an apparent weight of said object including a contribution from said outside acceleration;
   polling an acceleration sensor to determine said outside acceleration contributing to said apparent weight which causes said apparent weight to deviate from said object's true weight; and
   computing a corrected weight from said apparent weight and said outside acceleration.

23. The method of claim 22, further including the step of displaying said corrected weight.

24. The method of claim 22, wherein said sensor polling step includes the step of polling a plurality of sensors to determine said outside acceleration.

25. The method of claim 24, wherein said plurality of sensors provide a plurality of output signals and further including the step of averaging said plurality of output signals.

* * * * *